(12) United States Patent
Michau et al.

(10) Patent No.: US 8,534,561 B2
(45) Date of Patent: Sep. 17, 2013

(54) ANTENNA-FORMING INSERT AND CHIP CARD INCLUDING IT

(75) Inventors: Pascal Daniel Michau, Douai (FR); Gautier Etienne Jean Alloyez, Douai (FR)

(73) Assignee: Imprimerie Nationale, Paris (FR)

( * ) Notice: Subject to any disclaimer, the term of this patent is extended or adjusted under 35 U.S.C. 154(b) by 0 days.

(21) Appl. No.: 13/262,358

(22) PCT Filed: Mar. 30, 2010

(86) PCT No.: PCT/FR2010/050592
§ 371 (c)(1),
(2), (4) Date: Dec. 14, 2011

(87) PCT Pub. No.: WO2010/112761
PCT Pub. Date: Oct. 7, 2010

(65) Prior Publication Data
US 2012/0091208 A1    Apr. 19, 2012

(30) Foreign Application Priority Data
Apr. 1, 2009 (FR) ..................... 09 52099

(51) Int. Cl.
*G06K 19/02*    (2006.01)
(52) U.S. Cl.
USPC ............................ 235/488; 235/487; 235/494

(58) Field of Classification Search
USPC .......................................... 235/488, 487, 494
See application file for complete search history.

(56) References Cited

U.S. PATENT DOCUMENTS

| 7,377,446 B2* | 5/2008 | Ohta et al. ................... 235/492 |
| 2005/0066513 A1 | 3/2005 | Kayanakis et al. |
| 2010/0288842 A1 | 11/2010 | Elbaz et al. |

FOREIGN PATENT DOCUMENTS

| FR | 2 917 871 A | 12/2008 |
| WO | WO 03/102713 A2 | 12/2003 |
| WO | WO 2004/025553 A1 | 3/2004 |

* cited by examiner

*Primary Examiner* — Karl D Frech
(74) *Attorney, Agent, or Firm* — McDermott Will & Emery LLP

(57) ABSTRACT

The antenna-forming insert for a chip card includes a central layer forming an antenna including a substrate and at least one conductor extending along at least one face of the substrate. At least one cover layer covering on at least one side the central layer and capable of compensating for the irregularities of the surface of the central layer. Each cover layer includes a proximal sheet located in proximity to the central layer and a distal sheet located away from the central layer, both sheets being superposed and laminated and the proximal sheet during the lamination phase has lower fluidity than that of the distal sheet.

13 Claims, 2 Drawing Sheets

ANTENNA-FORMING INSERT AND CHIP CARD INCLUDING IT

RELATED APPLICATIONS

This application is the U.S. National Phase under 35 U.S.C. §371 of International Application No. PCT/FR2010/050592, filed on Mar. 30, 2010, which in turn claims the benefit of French Application No. 0952099, filed on Apr. 1, 2009, the disclosures of which Applications are incorporated by reference herein.

The present invention relates to an insert forming an antenna for a chip card, notably for an access with and without contact of the type including:
- a central layer forming an antenna including a substrate and at least one conductor extending along at least one face of the substrate;
- at least one cover layer covering at least on one side the central layer and able to compensate for the irregularities of the surface of the central layer.

Chip cards are currently used for access control, electronic banking, or further for forming an official identity document such as a national identity card.

So called <<contactless>> chip cards include an antenna with which a communication between the card and a suitable reader may be established through a radio link, without establishing electric contact between the reader and the chip of the card.

The antenna integrated into the card is for example formed with a conductor making its way at the surface of an insulating supporting substrate. The antenna is embedded in the thickness of the card, which is formed with a succession of generally polymer layers, assembled together.

For making the cards, it is known how to first form an insert forming an antenna including a central layer integrating the conductor forming the antenna and two cover layers covering on either side the central layer and each capable of compensating for the thickness irregularities of the central layer, resulting from the presence of the antenna.

Such an insert forming an antenna is then placed in the core of a chip card strictly speaking by hemming it in between two or more structure layers placed on either side. The chip is added in the thickness of the card. The connection between the chip and the antenna is achieved via a wire connection or else via a radio link. In the latter case, the antenna then includes an antenna section capable of communicating through the thickness of the card with a corresponding antenna electrically connected to the chip.

The presence of cover layers is explained by the requirement of obtaining an antenna-forming insert with good surface condition, so that a chip card may finally be obtained with substantially constant thickness and with good flatness condition.

In practice, an imperfect result is observed in the flatness of the antenna-forming insert in spite of the presence of the two cover layers positioned on either side of the central layer. Such is the case in particular when the central layer includes a set of through-holes, allowing the two cover layers to adhere to each other through the central layer.

These surface irregularities are sometimes used as distinctive elements of cards with which they may be distinguished from possible counterfeits. However, the latter proved to be detrimental to the visual aspect of the card, notably when the structure layers of the card are transparent.

The object of the invention is to propose an antenna-forming insert which may be used in a chip card with improved geometrical characteristics, for example improved flatness and a chip card provided with such an insert, for which the visual aspect is improved, notably when the external faces of the chip card are transparent and the characteristics of which give the possibility of meeting the requirements of the standards relating to the thickness of the card.

For this purpose, the object of the invention is an antenna-forming insert for a chip card of the aforementioned type, characterized in that said or each cover layer includes a proximal sheet located in proximity to the central layer and a distal sheet located away from the central layer, both sheets being superposed and laminated and the proximal sheet during the lamination phase has lower fluidity than that of the distal sheet.

According to particular embodiments, the antenna-forming insert includes one or more of the following features:
- the central layer, the proximal sheet and the distal sheet are bound together by simultaneous lamination;
- the central layer is without any electronic microcircuit and only includes one or more conductors forming an antenna;
- the substrate is crossed right through by holes opening out, through which the proximal sheets are connected;
- said or each conductor forms an identifiable pattern;
- the proximal sheet and the distal sheet are in polycarbonate;
- the proximal sheet has lower fluidity than that of the distal sheet at a temperature comprised between 160° C. and 200° C. and under a stress comprised between 10 N/cm$^2$ and 100 N/cm$^2$;
- the proximal sheet has lower fluidity than that of the distal sheet at a temperature comprised between 175° C. and 185° C. and under a stress comprised between 85 N/cm$^2$ and 95 N/cm$^2$.

The object of the invention is also a chip card characterized in that it includes in its middle portion, an insert forming an antenna according to any of the preceding claims, and on either side two structure layers, at least one of the layers including a chip.

According to particular embodiments, the chip card includes one or more of the following features:
- both structure layers are identical and of the same thickness;
- the chip card includes a spacer on the side of the insert forming an antenna, the antenna-forming insert and the spacer being hemmed in between both structure layers;
- said or each structure layer includes a layer thermally writable with a laser.

The object of the invention is also a method for making an insert forming an antenna as described above, characterized in that it includes the following steps:
- forming a central layer forming an antenna from a substrate and from at least one conductor extending along at least one face of the substrate;
- applying a proximal sheet and a distal sheet, superposed but dissociated, at least on one side of the central layer, the proximal sheet being located in proximity to the central layer and the distal sheet being located at a distance from the central layer, the proximal sheet during the subsequent lamination phase having lower fluidity than that of the distal layer;
- laminating together the central layer, said or each proximal sheet and said or each distal sheet.

The invention will be better understood upon reading the description which follows, only given as an example and made with reference to the drawings wherein.

Figure 1:
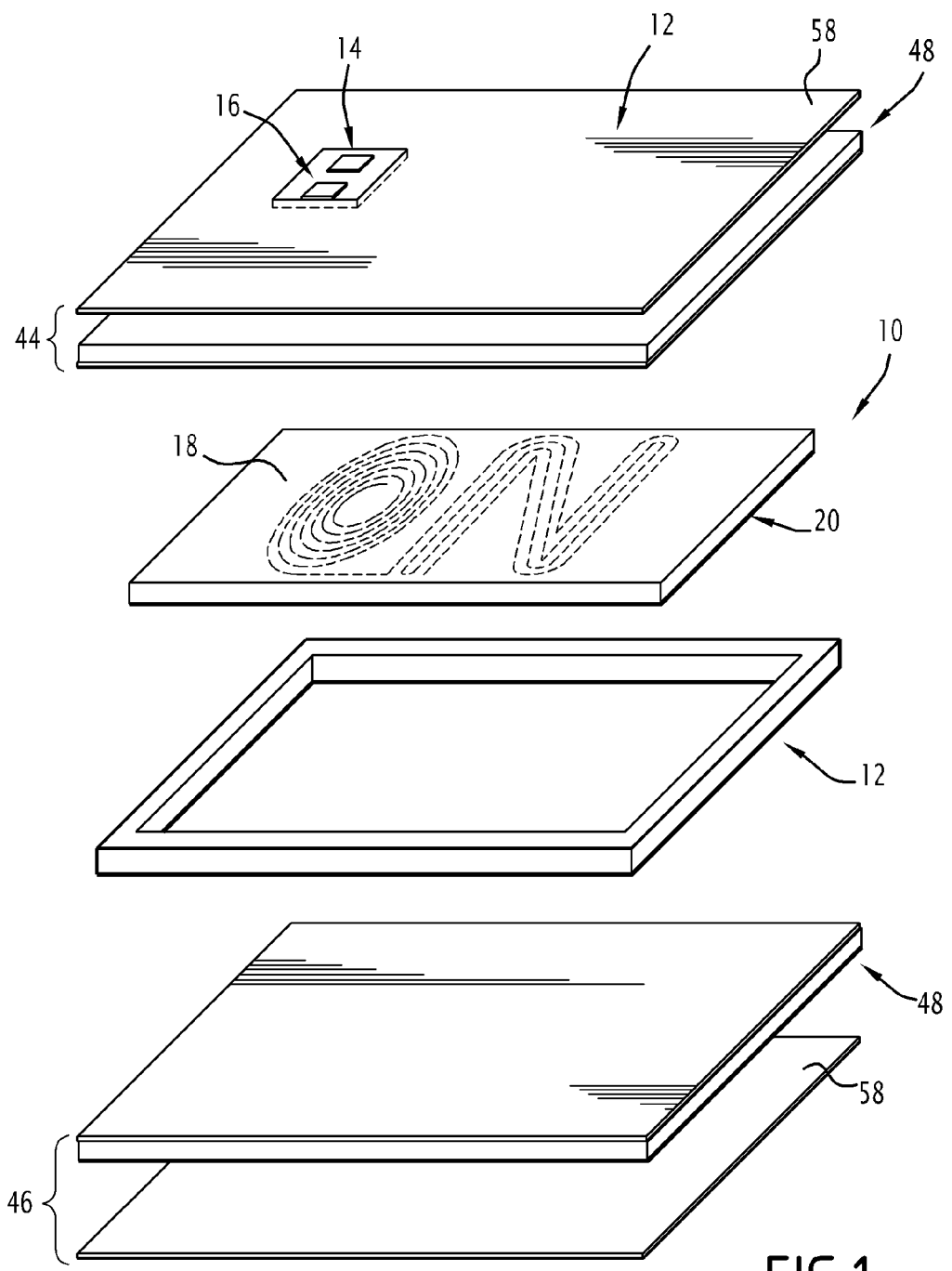
FIG. 1 is an exploded perspective view of a chip card according to the invention.

The card 10 illustrated in an exploded view in FIG. 1 is a so-called hybrid chip card for example used as a national identity card and allowing identification of the bearer from information contained in the card, this card including information stored in memory on the one hand and printed information on the other hand.

The card is hybrid in the sense that it includes a support 12 formed with an assembly of layers and two chips 14,16 each including an electronic microcircuit for storing and processing information, one being accessible by contact and the other being accessible without any contact.

Alternatively, the card is <<dual>> in the sense that it includes a single chip to which access is possible both by contact and without any contact. Still further according to another alternative, the card includes a single chip to which access is possible only without any contact.

In the example described here, one of the chips 14 is a so-called <<contact>> chip i.e. it has a flush face consisting of a set of adjacent contacts capable of cooperating with corresponding contacts of a card reader, in order to ensure an electric connection and transfer of information between the card reader and the microcircuit of the chip.

A second chip 16 is a so-called <<contactless>> chip. It includes a microcircuit, which may be accessed from a suitable card reader through an antenna 18 for transmitting and receiving information integrated into the card.

Figure 2:
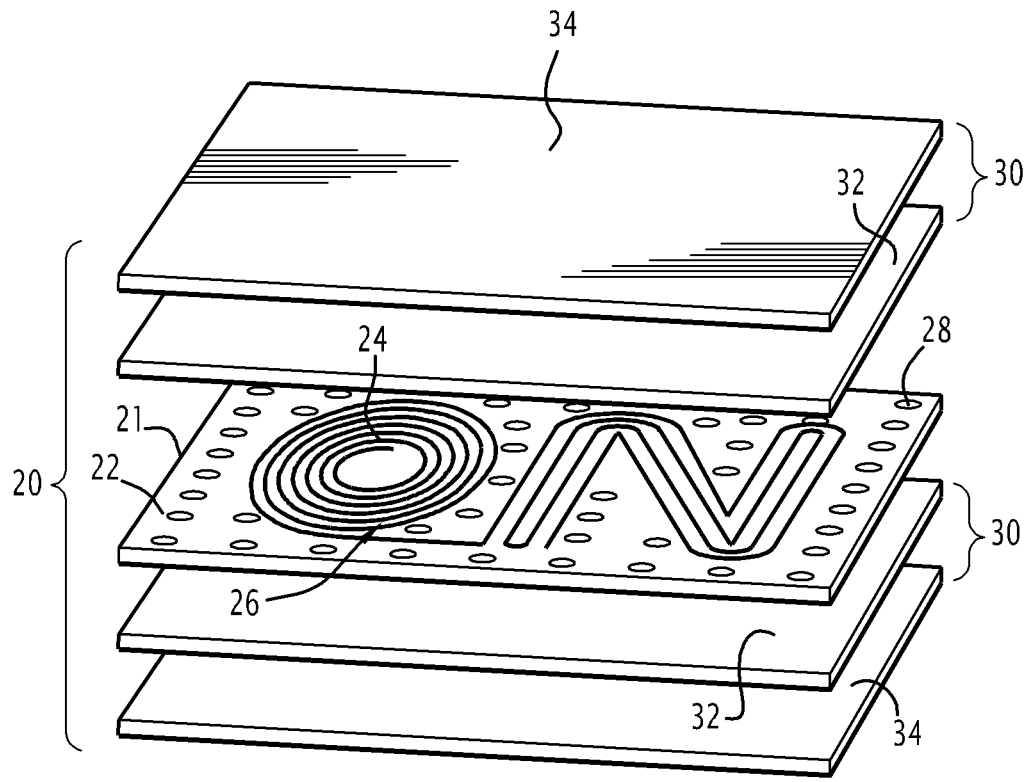
FIG. 2 is an exploded perspective view of details of the antenna-forming insert of the chip card of FIG. 1.

The antenna 18 is formed in an antenna-forming insert 20, the detailed structure of which is illustrated in FIG. 2.

The insert forming an antenna includes a central layer 21, consisting of a substrate 22 in the form of a sheet and of at least one conductor 24 extending along at least one face of the substrate.

Advantageously, the conductor 24 is formed by etching in an aluminium deposit made on at least one face of the substrate 22.

Preferably, a conductor 24 is provided on each face of the substrate 22, in order to increase the length of the antenna, the conductors of both faces being connected together.

Advantageously, at least one of the conductors makes its way along a recognizable pattern, such as for example one or several letters of the alphabet. In the illustrated example, a portion of the antenna forms the letter N. The other portion of the antenna 18 forms a loop 26 capable of ensuring electromagnetic coupling with the contactless chip 16. This loop 26 is formed at right angles to the chip 16. As this is known per se, the chip 16 is equipped with a complementary coil allowing electromagnetic coupling between the coil 24 and the chip 26, through electromagnetic interaction between both coils.

The substrate 22 is for example formed with a transparent material, such as polyethylene terephthalate currently designated by the acronym PET with a thickness comprised between 30 and 50 microns and preferably substantially equal to 40 microns.

The substrate 22 is crossed right through by holes 28 made on the essential part of the surface of the substrate outside the regions where the antenna-forming conductor extends. These holes 28 are capable of allowing connection through the substrate of cover layers 30.

Each face of the substrate 22 is covered with a cover layer 30 each formed with two superposed laminated sheets of different natures.

Both cover layers 30 are preferably identical.

Each layer 30 includes a proximal sheet 32 positioned in proximity to the central layer 21 and a distal layer 34 positioned at a distance from the central layer 21. Preferably, the proximal and distal sheets are the sole constituents of the cover layer 30 and the proximal sheet 32 is directly applied on the central layer 21.

The proximal layer 32 has a higher visco-elastic modulus than that of the distal sheet 34, i.e. when the latter are subject under the same conditions to a same mechanical stress, to a same temperature, the material of the distal sheet 34 flows more than the material of the proximal sheet 32. The fluidity of the distal sheet 34 is then greater than that of the proximal sheet 32. This property is especially true at the temperatures and under the conditions of mechanical stress, present during the phases for lamination of the insert, i.e. at a temperature comprised between 160° C. and 200° C., preferably between 175° C. and 185° C. and under a stress comprised between 10 $N/cm^2$ and 100 $N/cm^2$, preferably between 85 $N/cm^2$ and 95 $N/cm^2$. Both sheets are for example formed in the same material, such as polycarbonate, but with different characteristics notably as regards their visco-elastic properties and notably their flowability.

Thus, when subject to a rise in temperature and during application of a same pressure on both sheets, the proximal sheet flows less than the distal sheet, the viscosity of the proximal sheet then being greater than that of the distal sheet.

Thus, for example, each proximal sheet 32 is formed with a transparent polycarbonate sheet with a thickness comprised between 90 microns and 110 microns, preferably 105 microns. This sheet is for example formed with transparent Makrofol ID-6-2 marketed by BAYER.

The distal sheet 34 is formed with an opaque white polycarbonate sheet having a thickness comprised between 90 microns and 110 microns and preferably 100 microns. This sheet is formed for example with white Makrofol ID-4-4 marketed by BAYER.

The difference in flow is notably obtained by integrating into the polycarbonate a different amount of mineral fillers and notably of titanium dioxide.

Thus, the proximal sheet 32 includes an amount of titanium dioxide which is less than the amount of titanium dioxide of the distal sheet 34.

During the material flow, the presence of this mineral filler generates an increase in the fluidity of the material due to an increase in the energy caused by impacts between particles forming the filler.

The central layer 31, the proximal sheets 32 and the distal sheets 34 are bound together by simultaneous lamination.

This lamination is carried out in the form of a hot phase followed by a cooling phase.

During the hot phase, the three thicknesses are maintained at a temperature comprised between 175° C. and 185° C., preferably substantially equal to 180° C. The thereby formed stack is subject for 13 minutes to a pressure of 12 $N/cm^2$ and then for 14 minutes to a pressure of 90 $N/cm^2$, the latter being maintained at a temperature close to 180° C.

During the cooling phase, the stack is maintained at a pressure of 90 $N/cm^2$ until its temperature is close to 35° C., a temperature at which the insert may be handled.

During this lamination, the proximal sheets 32 flow through the holes 28 and bind to each other through material bridges formed through the holes, thereby ensuring cohesion of the assembly, even if the adherence between the PET substrate 22 and the proximal polycarbonate sheets 32 is low.

The fluidity of the material making up the proximal sheet 32 is lower than that of the material making up the distal sheet 34, the material of the sheet 32 fills with difficulty the holes of the central layer and therefore deforms very little, so that after lamination an insert may be obtained with very good surface flatness.

After lamination, the insert has a thickness substantially equal to 440 microns.

Figure 3:
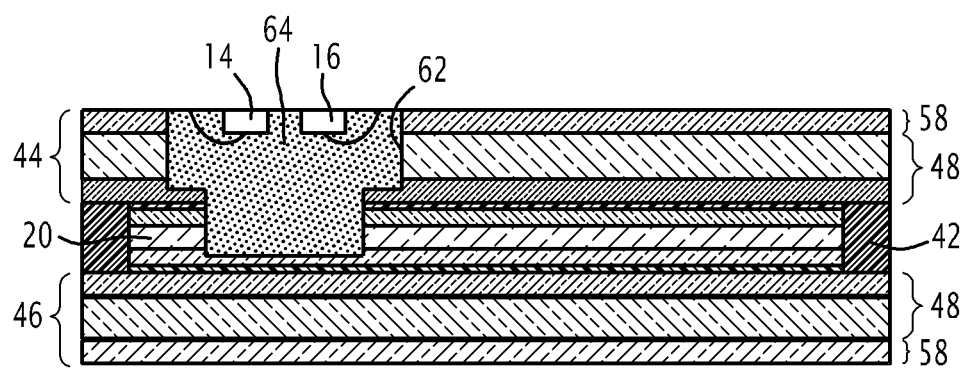
FIG. 3 is a sectional view of the chip card of FIGS. 1 and 2.

As illustrated in FIGS. 1 and 3, the antenna-forming insert is received in a thickness compensation frame 42, forming a spacer and is hemmed in between two layers of identical structure 44, 46 exteriorly having a contour identical with the outer contour of the frame 42 and with a larger surface than that of the antenna-forming insert 20.

The frame thickness 42 is slightly less than that of the insert 20, its thickness being for example 410 microns.

Each structure layer 44, 46 comprises a sheet 48 which is thermally writable with a laser. This sheet 48 is preferably with a thickness of 150 microns.

The sheet 48 on its exposed face bears decorative or informative elements obtained by offset printing and screen-printing. Preferably, the sheet 48 is thermally writable with a laser.

In each structure layer 44, 46, the sheet 48 is provided with security means of the <<optically variable image>> type, an image obtained by laser engraving with a tilt effect which is incorporated into the plastic cards: the images are engraved at different angles by a means of a set of embossed cylindrical lenses at the surface of the card. The image which may be seen thus varies according to the angle of observation.

Each sheet 48 is covered with a protective layer formed with transparent polycarbonate. This sheet is for example formed with Makrofol ID chemflex with a thickness of 55 microns, marketed by BAYER.

Alternatively, this protective layer is formed with a layer thermally writable with a laser such as for example a layer of Makrofol ID 6-2 750059 with a thickness of 75 microns, marketed by BAYER.

The chips 14 and 16 are accommodated in a recess 62 made in the thickness of one of the structure layers 44, 46 and partly in the insert 20. This recess is made by machining and the chips 14, 16 are embedded in a resin 64, the chip 14 being flush with the outer surface of the card and the chip 16 being positioned facing the coil 26.

For making the insert, the substrate 22 is first provided with conductors 24 and through-holes 28 are made in the thickness of the substrate. Several antennas, for example 48 in number, are made on a same substrate as an array with a sufficient interval between the antennas in order to form several inserts in a same substrate. The initially separate proximal and distal sheets 32, 34 are added onto each other against the central layer and spot welds are made, outside the bulk of the final inserts, between the three thereby applied layers.

Proximal and distal sheets are then added onto the other face of the central layer and spot welds are also made between the holes. The thereby formed assembly is placed in a lamination press and is preferably heated to 180° C. and laminated under a pressure of 12 N/cm² for 13 minutes and then 90 N/cm² for 14 minutes in order to ensure cohesion of the central layer and of the proximal and distal sheets, by melting of the material of the proximal layers through the holes 28 and by cohesion of both polycarbonate layers positioned on either side. The thereby formed assembly is then cooled as discussed earlier.

The thereby formed plate is then cut out in order to form a number of inserts equal to the number of antennas present on the central layer.

For manufacturing a card, the preferably transparent frame 42 is cut out beforehand along its inner contour and an antenna-forming insert 20 is inserted into the latter. The sheets forming the structure layers 44, 46 are then added by lamination.

Finally, machining is carried out in order to form the cavity and then the module including the chips 14, 16 is set into place and immobilized in the cavity.

It is observed that an antenna-forming insert formed in this way has very satisfactory flatness and that in particular the connections between the polycarbonate layers formed through the holes 28 cannot be perceived from the outer surface of the insert forming a card.

Thus, the final chip card has a satisfactory flatness condition. The flatness of the card is notably ensured because of the existence on either side of the insert forming a card, of identical structure layers 44, 46 with the same thickness. These physical characteristics guarantee observance of the standards by the card, notably the ISO standard, while giving the possibility of placing security patterns on its front side and/or on its back side.

The invention claimed is:

1. An antenna forming insert for a chip card comprising:
a central layer forming an antenna including a substrate and at least one conductor extending along at least one face of the substrate;
at least one cover layer covering on at least one side the central layer and compensating for the irregularities of the surface of the central layer;
wherein the at least one cover layer includes a proximal sheet located in proximity to the central layer and a distal sheet located away from the central layer, both sheets being superposed and laminated and the proximal sheet during the lamination phase has lower fluidity than that of the distal sheet.

2. The antenna forming insert according to claim 1, wherein the central layer, the proximal sheet and the distal sheet are connected together by simultaneous lamination.

3. The antenna forming insert according to claim 1, wherein the central layer is without any electronic microcircuit and only includes one or several conductors forming an antenna.

4. The antenna forming insert according to claim 1, wherein the substrate is crossed right through by opening holes through which the proximal sheets are connected.

5. The antenna forming insert according to claim 1, wherein said or each conductor forms an identifiable pattern.

6. The insert according to claim 1, wherein the proximal sheet and the distal sheet are in polycarbonate.

7. The insert according to claim 1 wherein the proximal sheet has lower fluidity than that of the distal sheet at a temperature comprised between 160° C. and 200° C. and under a stress comprised between 10 N/cm² and 100 N/cm².

8. The insert according to claim 7, wherein the proximal sheet has lower fluidity than that of the distal sheet at a temperature comprised between 175° C. and 185° C. and under a stress comprised between 85 N/cm² and 95 N/cm².

9. A chip card wherein it includes, in its middle portion, an antenna forming insert according to claim 1 and on either side two structure layers, at least one of the layers including a chip.

10. The chip card according to claim 9 wherein both structure layers are identical and of the same thickness.

11. The chip card according to claim 9, wherein it includes a spacer on the side of the antenna forming insert, the antenna forming insert and the spacer being hemmed in between both structure layers.

12. The chip card according to claim 9, wherein said or each structure layer includes a layer thermally writable with a laser.

13. A method for manufacturing an antenna forming insert according to claim 1, comprising the following steps:
- forming a central antenna forming layer from a substrate and from at least one conductor extending along at least one face of the substrate;
- applying a proximal sheet and a distal sheet superposed but dissociated, at least on one side of the central layer, the proximal sheet being located in proximity to the central layer and the distal sheet being located at a distance from the central layer, the proximal sheet during the subsequent lamination phase having lower fluidity than that of the distal layer; and
- laminating together the central layer, said or each proximal sheet and said or each distal sheet.

* * * * *